United States Patent [19]

Yen et al.

[11] Patent Number: 5,032,274

[45] Date of Patent: Jul. 16, 1991

[54] PROCESS FOR PRODUCING FLUOROCARBON MEMBRANES AND MEMBRANE PRODUCT

[75] Inventors: Larry Y. Yen, Tewksbury; George Lopatin, Newton Centre; Howard Malarkey, Lowell, all of Mass.; David Soane, Piedmont, Calif.

[73] Assignee: Millipore Corporation, Bedford, Mass.

[21] Appl. No.: 569,060

[22] Filed: Aug. 17, 1990

Related U.S. Application Data

[60] Division of Ser. No. 412,959, Sep. 26, 1989, Pat. No. 4,990,294, which is a continuation-in-part of Ser. No. 190,285, May 4, 1988, Pat. No. 4,902,456.

[51] Int. Cl.$^5$ .............................................. B01D 71/32
[52] U.S. Cl. ........................... 210/500.42; 210/500.23; 521/61; 521/64; 521/134
[58] Field of Search .................... 210/500.23, 500.42; 521/61, 64, 134

[56] References Cited

U.S. PATENT DOCUMENTS

| | | | |
|---|---|---|---|
| 2,915,483 | 12/1959 | Barnhart | 521/145 |
| 3,379,658 | 4/1968 | Kemper | 521/61 |
| 3,518,332 | 6/1970 | Sklarchuk et al. | 521/61 |
| 3,536,796 | 10/1970 | Rock | 521/61 |
| 4,181,983 | 1/1980 | Kulkarni | 521/61 |
| 4,623,670 | 11/1986 | Mutoh et al. | 521/134 |
| 4,702,836 | 10/1987 | Mutoh et al. | 521/145 |

Primary Examiner—Morton Foelak
Attorney, Agent, or Firm—Andrew T. Karnakis; Paul J. Cook

[57] ABSTRACT

Microporous or open ultrafiltration poly (tetrafluoroethylene-co-perfluoro-(alkyl vinyl ether)) (PFA) or poly (tetrafluoroethylene-co-hexafluoropropylene) (FEP) film membrane or hollow fibers having open pores are formed from a melt blend of 10 to 35 weight percent of the PFA or FEP and a chlorotrifluoroethylene oligomer solvent. The melt blend is shaped and one or more surfaces of the shaped melt blend are coated with the solvent prior to phase separation of the melt blend. Coating the membrane with solvent during shaping results in membrane having larger pores on that membrane surface as compared to membranes not coated with solvent. The shaped melt blend is cooled to effect phase separation and crystallization of the PFA or FEP from the blend. The solvent is separated from the PFA or FEP by extraction and the porous PFA or FEP is heat set under restraint to prevent shrinkage. In one embodiment of this invention the dry film membrane recovered after extraction or the membrane wet with extraction liquid is stretched in the cross-web direction to below its breaking limit, dried restrained and then heat-set.

2 Claims, 14 Drawing Sheets

PROCESS FOR PRODUCING FLUOROCARBON MEMBRANES AND MEMBRANE PRODUCT

This is a divisional of co-pending application Ser. No. 07/412,959 filed on Sept. 26, 1989, now U.S. Pat. No. 4,990,294 application which is a continuation in part of copending application Ser. No. 190,285, filed May 4, 1988, now U.S. Pat. No. 4,902,456.

BACKGROUND OF THE INVENTION

This invention relates to a process for producing microporous or open ultrafiltration poly(tetrafluoroethylene-co-perfluoro (alkyl vinyl ether)) (PFA) or poly (tetrafluoroethylene-co-hexafluoropropylene) (FEP) membranes under conditions to control membrane surface porosity to improve membrane permeability and to the membrane so-produced.

Microporous and open ultrafiltration membranes include thin sheets and hollow fibers generally formed from synthetic thermoplastic materials and having a substantially continuous matrix structure containing open pores or conduits of small size. The mean pore size range for pores of "microporous and open ultrafiltration membranes" is not precisely defined in the art, but it is generally understood to extend from about 0.02 microns to about 10 microns. Microporous and open ultrafiltration membranes having open pores thereby imparting permeability are useful in fine filtration.

PFA and FEP polymers are desirable filtration membrane materials because of their excellent chemical and thermal stabilities. However, their inherent inert nature also renders them unamenable to be cast into membranes by conventional solution immersion casting processes. Currently, microporous membranes using similarly inert materials are disclosed in U.S. Pat. Nos. 3,953,566; 3,962,153; 4,096,227; 4,110,392; 4,187,390; 4,248,924; 4,482,516 and 4,598,011. The process disclosed in these patents comprises stretching sintered poly(tetrafluoroethylene) (PTFE) particles to create a pore structure characterized by nodes interconnected by fibrils. The pores are highly elongated in the stretch direction.

U.S. Pat. Nos. 4,623,670 and 4,702,836 disclose a process for forming microporous membranes from a fluoropolymer resin selected from the group consisting of ethylene-tetrafluoroethylene copolymer, ethylene-chlorotrifluoroethylene copolymer and poly(chlorotrifluoroethylene). In this process, an inorganic filler is required in melt molding the polymer with a chlorotrifluoroethylene oligomer. The filler and oligomer are dissolved out of the polymer to form voids. The use of fillers in microporous membranes used in filtration is highly undesirable since all of the fillers cannot be removed by solvation and the fillers remaining may migrate into the filtrate and contaminate it. Although the three fluoropolymers disclosed by these patents have good chemical and thermal resistance, they are inferior in stabilities when compared to PFA and FEP.

A method for making a porous fluorinated polymer structure is disclosed in U.S. Pat. No. 4,434,116. It involves forming a solvated or partially solvated polymer/solvent mixture. The polymer for which this is applicable comprises a copolymer of tetrafluoroethylene and perfluoro vinyl ether with a sulfonyl fluoride ($-SO_2F$), sulfonate ($-SO_3Z$) or carboxylate ($-COOZ$) functional group wherein Z is a cation. The presence of the polar functional group greatly enhances the dissolution of this polymer. A variety of organic solvents have been reported. The method described is based on thermal phase separation of the polymer/solvent mixture and specified that the solvent (porogen) is a solid at room temperature and must crystallize after phase separation. The solvent is then removed from the blend in the solid state. No pore morphology or permeability data of the porous structure were given.

The use of stretching technique as a primary means to form microporous membranes has been described in U.S. Pat. Nos. 3,953,566; 3,962,153; 4,096,227; 4,110,392; 4,187,390; 4,248,924; 4,482,516 and 4,598,011. The process disclosed in these patents comprises stretching sintered poly(tetrafluoroethylene) (PTFE) particles to create a pore structure characterized by nodes interconnected by fibrils. No dissolution of polymer in solvent or thermal phase separation is involved in the membrane formation scheme.

The combination use of thermal phase separation from a melt blend (solution) and subsequent stretching (orientation) to form microporous membranes was described in U.S. Pat. No. 4,539,256. In this process, between 30 and 80% of a thermoplastic polymer is mixed with a solvent at an elevated temperature high enough to dissolve the polymer. Thereafter the mixture is cooled to effect crystallization of the polymer. A shaped article such as a film is formed during cooling. The film is subsequently stretched (either before or after solvent extraction) in at least one direction to produce the product. The product has a morphology characterized by a multiplicity of spaced, randomly dispersed non-uniform shaped, non-porous particles of the polymer. Adjacent particles throughout the material are separated from one another to provide micropores and which particles are connected to each other by a plurality of fibrils. No fluorocarbon polymers are included in the examples of crystallizable polymers. All the polymer/solvent systems disclosed are systems that exhibit solid (crystalline)/liquid phase separation behavior upon cooling from a one phase solution.

In applicants' prior application referred to above, a PFA or FEP melt blend film is extruded onto a quench medium device such as a quench roll. Both surfaces of this film are exposed to a short air gap distance before one side contacts the quench roll on which the entire film is subsequently quenched to effect phase separation. During the air gap residence period and part of the duration on the quench roll, it is believed that evaporation of the solvent from the surfaces of the film will occur before phase separation of the melt blend is completed. This is especially true of the film's surface that is not in direct contact with the quench roll surface during quenching because of its longer exposure period to ambient atmosphere at higher temperature. The evaporation is exacerbated by the very high temperature of the extrudate. The overall effect on the final resultant membrane is poor control of densification on the surfaces.

It would be desirable to provide a versatile process for producing microporous and open ultrafiltration membranes from PFA or FEP which permits control of the pore structure of one or both membrane surfaces and of the internal pore structure.

SUMMARY OF THE INVENTION

The present invention provides an improved process for casting PFA or FEP membrane which allows for control of the membrane's surface porosity. For membranes where retention is not governed by the surface layers, it is generally desirable to have high surface porosity on both surfaces of the membrane, since this will lead to higher fluid permeability. A membrane with similarly open surfaces on both sides is a symmetric membrane. For membranes where retention is controlled by the structure of a surface layer, it is still desirable to have high internal porosity and an open surface on the reverse side to achieve good overall permeability. The latter membrane structure where one side has a relatively tight surface which functions as a permselective layer while the remaining structure is more openly porous is sometimes referred to as an asymmetric membrane.

A mixture is formed comprising between about 10 and about 35 weight percent FEP or PFA and the remainder a solvent (porogen) comprising chlorotrifluoroethylene oligomer which permits liquid-liquid phase separation rather than solid-liquid phase separation upon cooling from elevated temperature and solidification of the polymer. The mixture is heated and extruded to form a film or hollow fibers. Pure solvent at high temperature is co-extruded with the melt blend to contact one or both surfaces of the extruded hot melt blend and thus controlling the surface porosity of the membrane. The coextruded solvent contacts the coextruded melt blend prior to phase separation of the melt blend. The extruded melt blend is cooled to effect liquid-liquid phase separation to form a gel film. The solvent is separated from the polymer by extraction and the resultant microporous polymeric membrane is dried under restraint in order to minimize o prevent membrane shrinkage and collapse. Optionally an uniaxial stretching step can be included after the extraction step in the process of this invention.

DESCRIPTION OF SPECIFIC EMBODIMENTS

Figure 1:
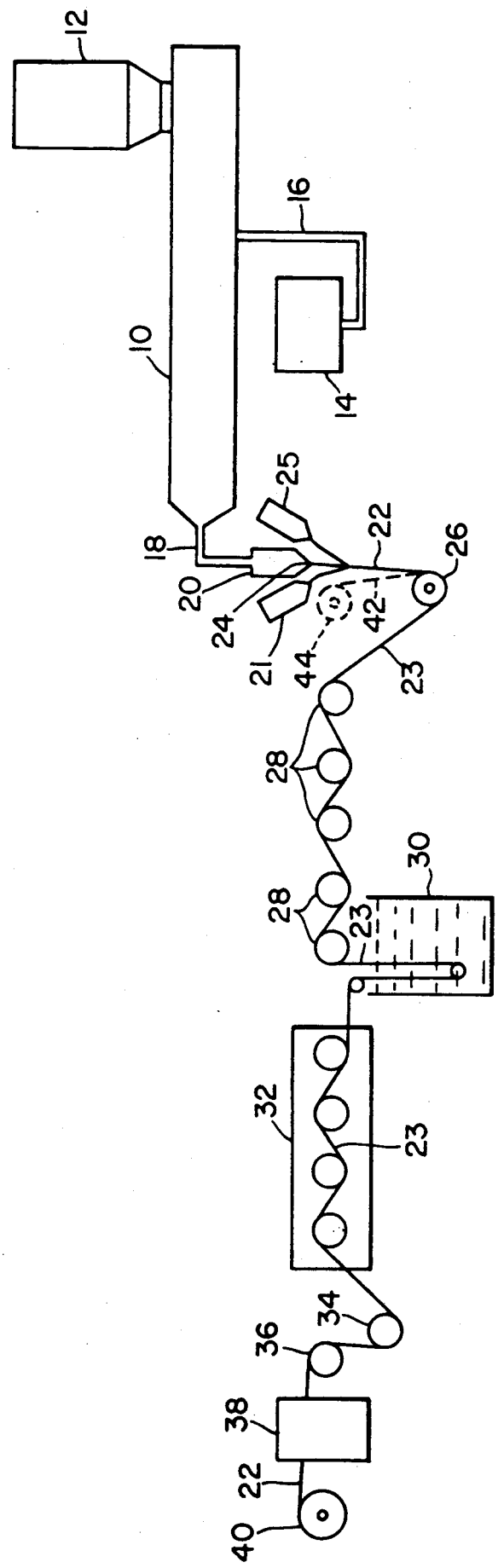
FIG. 1 is a flow diagram depicting the process of this invention.

In accordance with this invention, it has been found that membranes having a desired porosity and strength can be formed from a melt blend of poly(tetrafluoroethylene-co-perfluoro(akly vinyl ether)) PFA or poly(-tetrafluoroethylene-co-hexafluoropropylene) FEP and a solvent which permits liquid-liquid phase separation on cooling which comprises heated chlorotrifluoroethylene oligomer oil. Examples of PFA and FEP are commercially available as Telflon ® PFA and FEP (DuPont) and Neoflon TM PFA (Daikin Industries). The PFA or FEP comprises between about 10 and about 35 percent weight percent of the blend. If a proportion greater than about 35 weight percent in the blend is employed, the resulting membrane will have an undesirably low porosity while membranes formed from melt blends having a concentration of PFA or FEP less than about 10 percent are too weak for use in environments which require adequate mechanical stability. The use of this solvent has been found to be essential in the process of this invention.

In the first step of this invention a melt blend of the PFA or FEP and the solvent is prepared. The melt blend is formed by heating to at least the melting temperature of the PFA or FEP and usually between about 280° C. and about 310° C., preferably in an inert atmosphere such as nitrogen since oxygen tends to decompose the solvent at the high temperatures needed to form the melt blend. In the formation of the melt blend, the PFA or FEP and the solvent are mixed such as in the mixing barrel of a conventional twin screw extruding apparatus wherein the mixture is heated during mixing. The melt blend is passed from the extrusion zone through a slot die or a hollow fiber die to form molten film or molten hollow fiber.

In the present invention for film, the surface of the melt blend film is protected by co-extruding a layer of hot pure solvent on the formed melt blend surface or surfaces as the blend exits from the forming die. It is desirable to have this solvent layer contact the surface of the film as close to the die's exit point as possible so that phase separation of the formed melt blend does not occur prior to its contact with the solvent. The amount of co-extruded solvent can be adjusted as deemed necessary. Increased amounts of solvent provide increased surface porosity.

Symmetric film membranes having similarly open surfaces on both sides can be cast by co-extruding the solvent on both sides of the melt blend film. Asymmetric membranes also can be cast by extruding a solvent layer only on one side of the film; that being the surface which was not in direct contact with the quench roll as the melt blend is being cooled. In this case, it is desirable to use as small an air gap as possible to minimize the solvent evaporation effect on the unprotected surface. By choosing an appropriate quench roll temperature, the resultant asymmetric membrane has one relatively tight surface (direct contact side with quench medium) and an open surface on the reverse side where solvent was deposited. The effective pore size of the membrane is determined by the structure of this tight surface which can be controlled by adjusting the temperature of the quench roll.

An alternative method to achieve an asymmetric structure can be to co-extrude solvent on both surfaces as in the symmetric membrane case, but differentially adjust the amount being applied together with choosing a quench roll temperature to achieve the desired degree of asymmetry. Extrusion of open surface hollow fibers can similarly be produced by co-extruding or coating solvent onto the outer surface of hollow fibers. Alternatively, solvent can be coextruded into the lumen of the hollow fiber to effect an open interior surface. As in the film case, proper adjustment of solven flow and quench bath termperature can effect the formation of asymmetric structures.

The extruded gel membrane or fibers then is immersed into a liquid bath which selectively imbibes the solvent thereby removing it from the PFA or FEP matrix without substantially softening or dissolving the polymer. The imbibing extraction liquid can also function as a quench medium such that the molten film or hollow fibers can be extruded directly into it. In this case, the quench and extraction steps take place in the same bath. Suitable imbibing liquids include 1,1,2 trichlorotrifluoroethene (Freon TF), 1,1,1 trichloroethane, carbon tetrachloride, hexane or the like. Extraction can be effected at a temperature between about 20° C. and about 50° C. in order to maximize solvent extraction while not softening the polymer. The polymer then is dried at a temperature usually between about 20° C. and about 50° C. and, during drying, the membrane is restrained in order to prevent shrinkage. Optionally, the dry membrane can be heat-set by heating it to a temperature between about 200° C. and about 300° C. in order to further set the characteristic of the membrane. The membrane then can be rolled onto a core for storage.

It has been found that stretching film membranes after solvent extraction can be utilized to form membranes having surfaces of increased porosity with or without coextrusion of the solvent and melt blend. Such stretching is effected at a force below the breaking point of the membrane. The stretching step results in the breaking open of the cast membrane's surfaces which leads to increased fluid permeability. An increase in pore size (decreased bubble point) also results.

In one embodiment of this invention, the film membrane is stretched in the transverse (cross web) direction to a predetermined limit below its breaking limit and is restrained in the stretched position. Stretching can be effected On a dry membrane precursor after the solvent has been extracted or in a precursor membrane which is wet With the extracting liquid for the solvent after the solvent has been removed from the membrane. Stretching serves to provide membrane with larger pores having higher permeability. Stretching can be effected up to a limit of about 100 percent of the width of the unstretched membrane.

Figure 26:
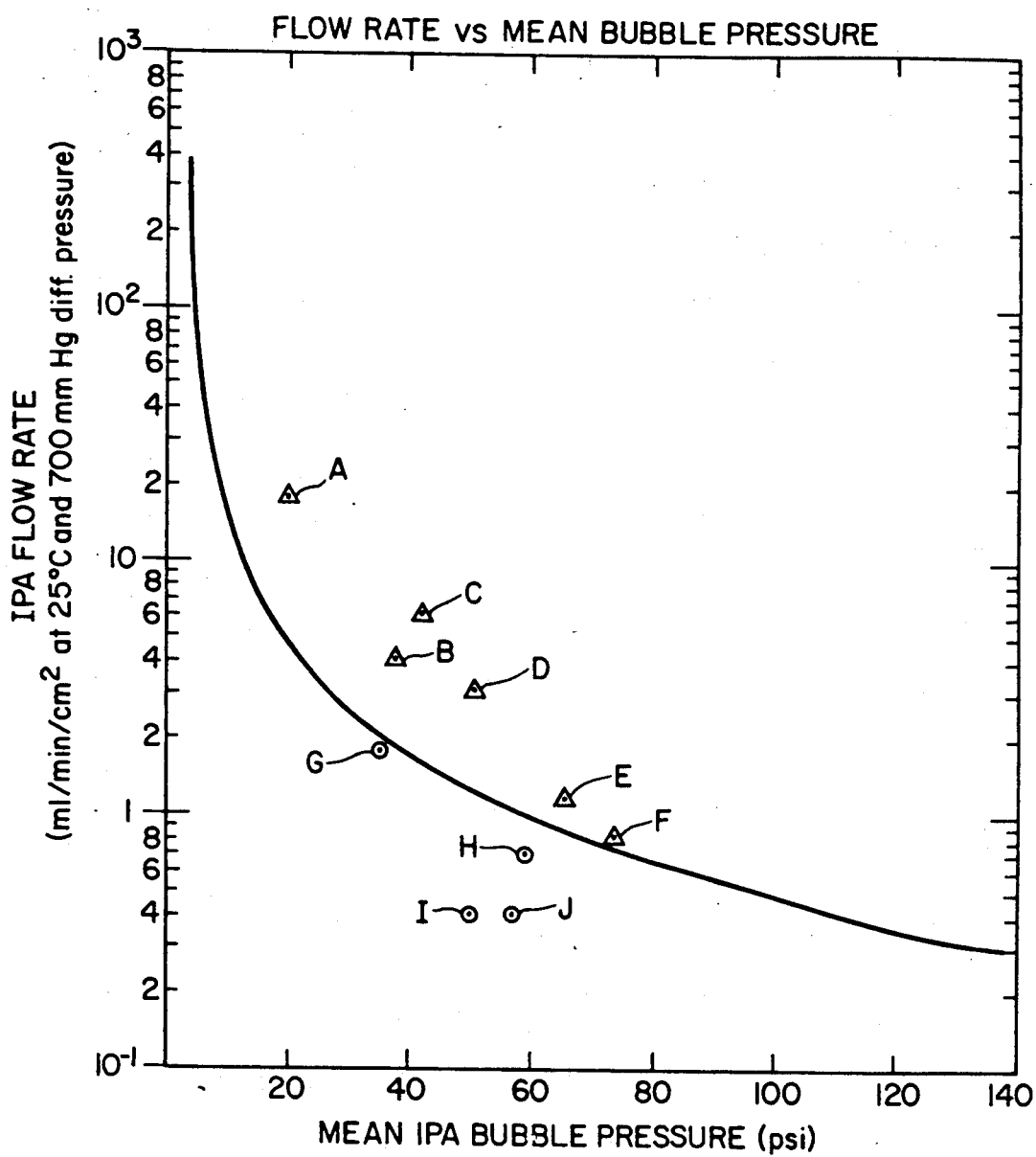
FIG. 26 shows isopropyl alcohol (IPA) flow rate as a function of mean IPA Bubble pressure for various membranes of this invention and membranes of the prior art.

The microporous product of this invention is characterized by increased IPA flow rate as a function of mean IPA bubble pressure. As shown in FIG. 26, the membranes of this invention denoted as points A, B, C, D, E and F have significantly higher IPA flow rates and thus are more open then the membranes available prior to this invention as denoted at points G, H, I and J. Point A characterizes the membrane of Example 1 of this application. Point B characterizes the membrane of example 5 of this application. Point C characterizes the membrane of example 6 of this application. Point D characterizes the 45% stretched membrane of example 6 of this application. Point E characterizes the membrane of example 3 of this application. Point F characterizes the unstretched membrane of example 6 of this application. Point G characterizes the membrane of example 4 of the parent application to this application. Point H characterizes the comparative membrane of example 4 of this application. Point I characterizes the comparative membrane of example 5 of this application. Point J characterizes the membrane of example 5 of the parent application to this application. The membrane of this invention are those characterized by points above the curve of FIG. 26.

A typical process useful for producing a film membrane product of his invention is depicted in FIG. 1. An extruder 10 is provided which is connected to a hopper 12 from which PFA or FEP and chlorotrifluoroethylene oligomer mixture is introduced into the extruder 10. A tank 14 and conduit 16 are provided for introducing additional chlorotrifluoroethylene oligomer into the extruder 10 for admixture with the PFA or FEP. The melt blend of polymer and solvent is removed from extruder 10 through conduit 18 and into die 20 from which a film membrane 22 exits through orifice 24. Chlorotrifluorethylene oligomer is extruded from one or more of dies 21 and/or 25 to coat one or more surfaces of the film 22 with solvent. Extrudate film 22 passes over chill roll 26 where the extrudate film 22 is cooled to a temperature for effecting microphase separation of the polymer and the solvent into a gel membrane 23. The gel membrane 23 then passes over the guide rolls 28 and then through the bath 30 containing a liquid extractant for the solvent. Membrane 23 then passes out of the bath 30 into an enclosed heating zone 32 wherein the edges of the membrane 23 are restrained while the membrane is optionally heated in order to dry the membrane. The membrane 23 then passes over guide rollers 34 and 36 into heat-setting zone 38 wherein the membrane 23 is heat-set by heating. The membrane 23 passes out of the heat-setting zone 38 onto wind up roller 40.

By co-extruding a pure solvent layer on the surface of the PFA/CTFE or FEP/CTFE oil melt blend film during the casting of the PFA membrane, one can achieve a membrane surface with much higher porosity (lower density) than that of the prior art. A surface with high porosity will lead to higher fluid permeability for the same given pore size or retention character of the membrane. To be most effective, this solvent layer ought to be deposited before the main film is exposed to an environment which permits solvent evaporation from the melt blend and subsequent phase separation.

By co-extruding pure solvent on both sides of a melt blend film, a symmetric PFA or FEP membrane with two similarly open surfaces can be formed with good flow properties for the measured bubble point (pore size).

By applying solvent on one side of the film during casting and preferentially quenching the uncoated side by direct contact with a quench roll surface, an asymmetric membrane structure is produced. This structure has one open surface and a relatively tight but permeable reverse surface which governs the overall bubble point. Asymmetric structures are particularly useful when small pore size (high bubble point) membranes are required for fine particle filtration application.

The following examples illustrate the present invention and are not intended to limit the same.

EXAMPLE 1

This example describes the process of casting a symmetric PFA membrane with open morphology on both surfaces by using the solvent co-extrusion method on both sides.

Powder grade Teflon ® PFA (DuPont TE9725) was blended with chlorotrifluoroethylene oligomer (CTFE oil) (Halocarbon oil #56, Halocarbon Products Corp.) to form a wet powdery mixture consisting of 45% (w/w) PFA polymer. This mixture was fed into a twin-screw compounding extruder (Baker-Perkins model MPC/V-30/L/D=13) via a screw feed hopper (Brabender model 05-30-000) equipped with wiper and stirrer blades. Additional pure CTFE oil #56 was injected down-stream into the extruder near the mid-section of the barrel, using a metering pump (FMI model RP-G1500) for delivery. The feed rates of the powder blend and down-stream oil were 12.5 and 18 gm/min. respectively. The overall melt blend extrudate concentration would be approximately 19% (w/w) of PFA.

The twin screws in the extruder consist of feed screw elements and mixing paddles to provide capability for melting, mixing and conveying of the melt blend. A 10cm. wide vertical-exiting film die was used downstream of the extruder to form a film of the PFA/CTFE oil melt blend. The die gap was set at approximately 0.75 mm. Mounted on each side of the die is a compartment with a narrow exiting slit (10 cm. width) next to the die lip for co-extruding a pure CTFE oil layer onto the surface of the melt blend film. The oil feed rate at one side of the die was 9.2 gm/min and the other was 3.3 gm/min. The oil compartments for co-extrusions are maintained at the same temperature as the main die. The temperature of the various zones of the extrusion line ranged from, 250° C. to 305° C. with an increasing temperature profile from the powder feed zone to the die. Screw speed was set at 250 rpm. The thickness of the quenched film was 115 μm.

The extrudate film with the co-extruded oil layers was quenched on a rotating chrome plated quench roll. The air gap distance was 1.3 cm. The side with the lesser amount of co-extruded oil was in direct contact with this roll which was maintained at 134° C. by circulating thermostated silicon oil through its core. The quenched film was rolled up with a motorized take-up unit.

To remove the CTFE oil from the quenched film, a piece of the sample was restrained on a metal frame and placed in an excess volume of 1,1,2 trichlorotrifluoroethane (Freon TF) for extraction. The extraction time was approximately 2 hrs. with two fresh Freon changes during this time. The restrained sample was then removed from the Freon and allowed to dry at room temperature. The sample was then further heat-set with restraint at 295° C. for 30 mins.

Figure 2:
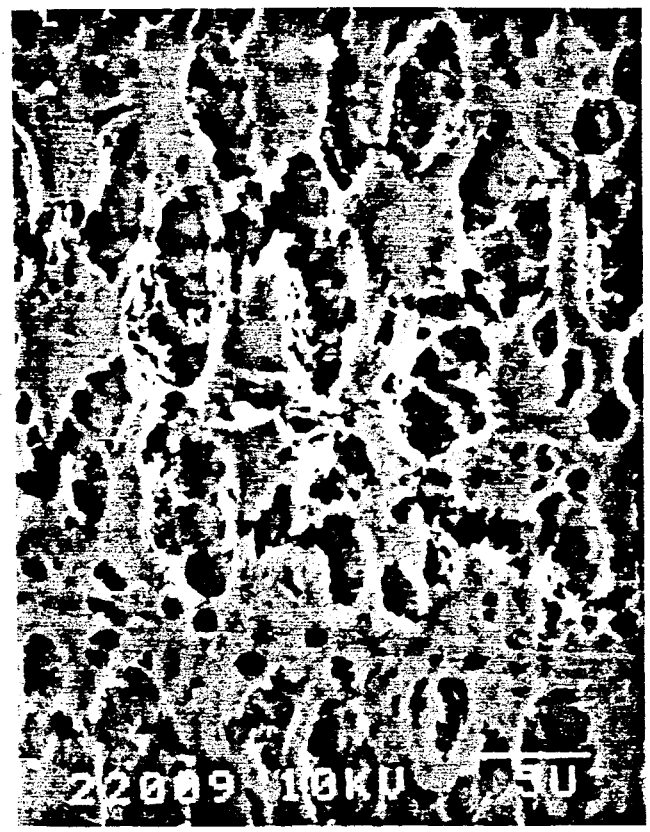
FIG. 2 is a scanning electron micrograph (SEM) (3000×) of a microporous poly (tetrafluoroethylene-co-perfluoro(alkyl vinyl ether))(PFA) membrane made in accordance with Example 1.
Figure 3:
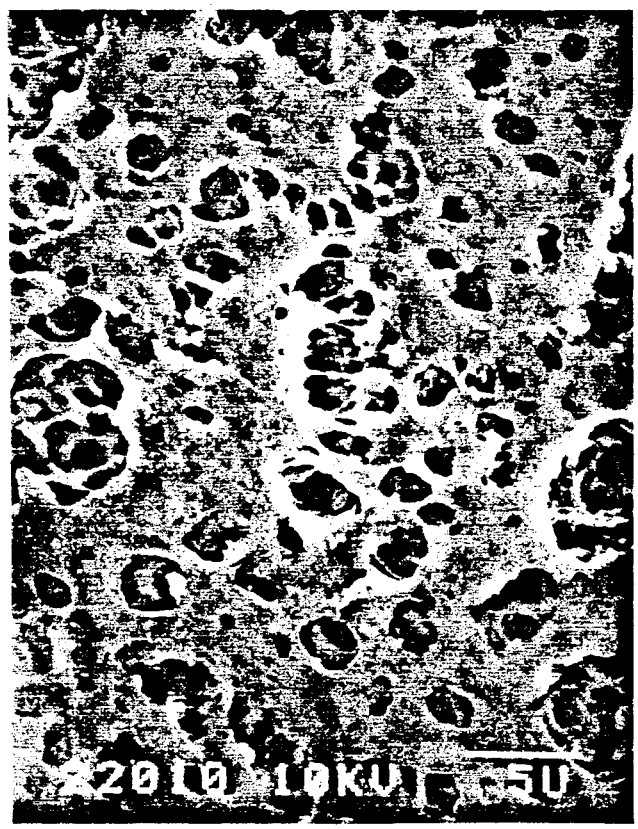
FIG. 3 is an SEM (3000×) of the opposing surface of the membrane of FIG. 2.
Figure 4:
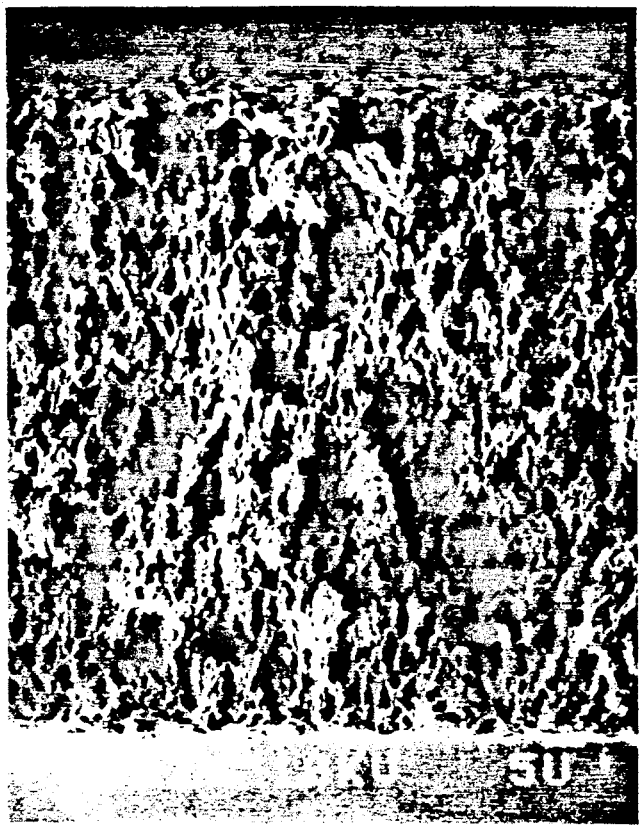
FIG. 4 is an SEM (1000×) of the cross section of the membrane shown in FIGS. 1 and 2.

The scanning electron (SEM) photomicrographs of the sample are shown in FIGS. 2–4. FIGS. 2 and 3 indicate both surfaces of the membrane are highly porous. FIG. 4 shows its cross-section revealing its internal morphology. The properties of this membrane are:
Isopropyl Alcohol Bubble Point[1]=15 psi
Mean Isopropyl Alcohol Bubble Pressure[1]=19 psi
Isopropyl Alcohol Flow Rate[2]=18.4 ml/min/cm$^2$.
Thickness=80 μm.
Porosity[3]=68%

EXAMPLE 2

Example 1 was repeated under similar casting conditions except no solvent was co-extruded on either side of the melt blend film during extrusion. The extraction and heat-setting were also performed similarly except extraction time was considerably longer (approximately 24 hours.) due to very slow CTFE oil removal rate from the quenched film.

Figure 5:
FIG. 5 is a SEM (5000×) of one surface of the PFA membrane made in accordance with Example 2.
Figure 6:
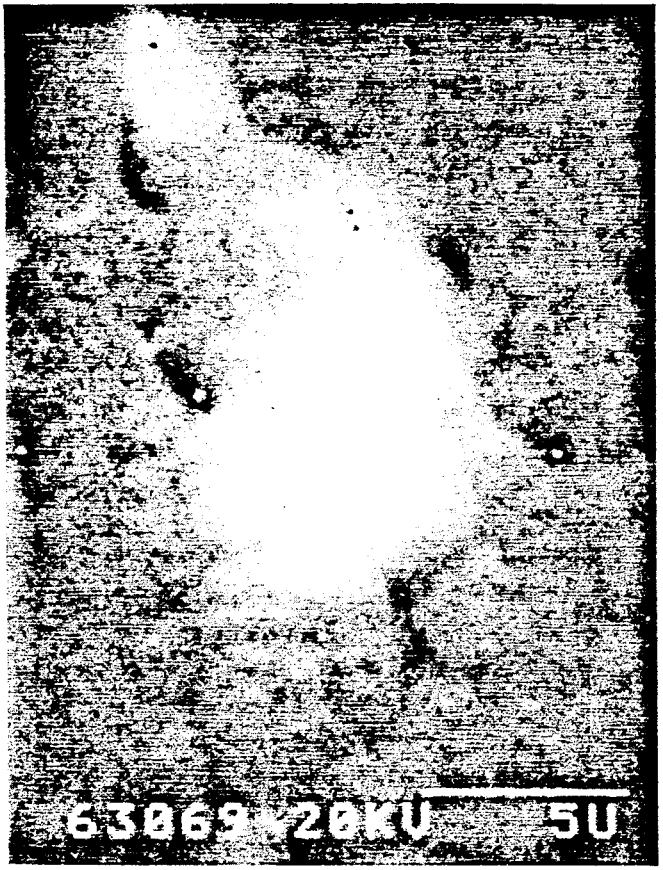
FIG. 6 is a SEM (5000) of the opposing surface of the PFA membrane made in accordance with Example 2.
Figure 7:
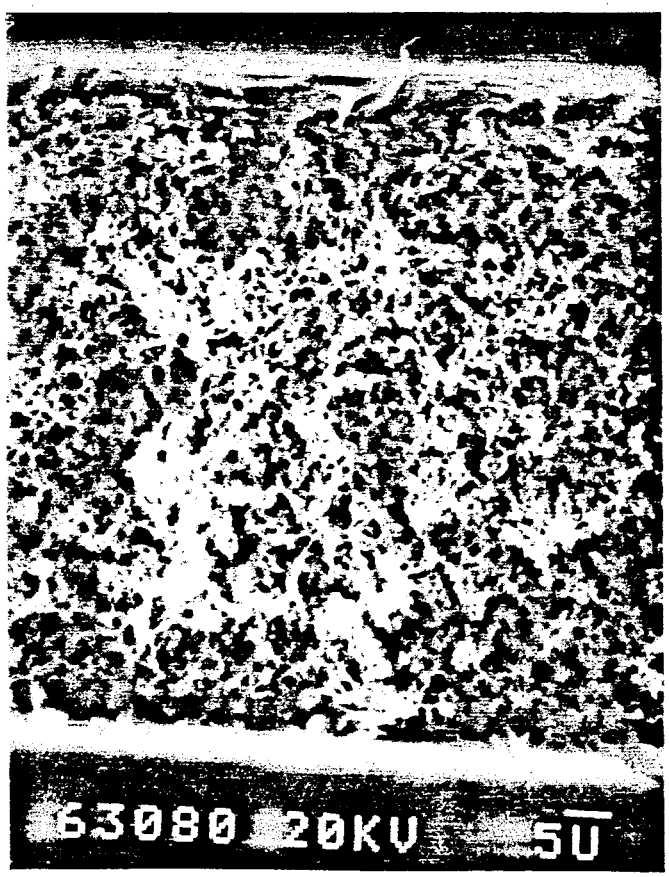
FIG. 7 is an SEM (1000×) of the cross-section of the membrane of FIGS. 5 and 6.

The SEM photomicrographs of this sample are shown in FIGS. 5–7. FIGS. 5 and 6 indicate both surfaces are highly dense (non-porous) in nature. FIG. 7 shows the cross-section with a porous internal structure similar to that in Example 1. Also, this sample did not appear to be wettable with isopropyl alcohol. Therefore, no reliable bubble point could be measured. The isopropyl alcohol flow rate[2] is <0.1 ml/min/cm$^2$. The thickness and porosity are 82 μm and 68% respecitvely.

EXAMPLE 3

This example illustrates casting an asymmetric PFA membrane by co-extruding solvent only on one side of the melt blend film during extrusion. The resultant membrane has an open surface where solvent was originally deposited and a relatively tight surface on the reverse side which contacted the quench roll surface during quenching.

The experimental method and conditions used were essentially the same as that described in Example 1 except for the following changes:

(1) Downstream CTFE oil feed into extruder=20.5 gm/min., thus overall PFA concentration in extrudate melt blend would be approximately 17% (w/w).

(2) CTFE oil co-extrusion rate on surface away from the quench roll contact=6.2 gm/min., and no oil on surface that contacted the quench roll.

(3) Quench roll temperature=209° C.

(4) Quenched film thickness (before extraction)=90 μm.

Figure 8:
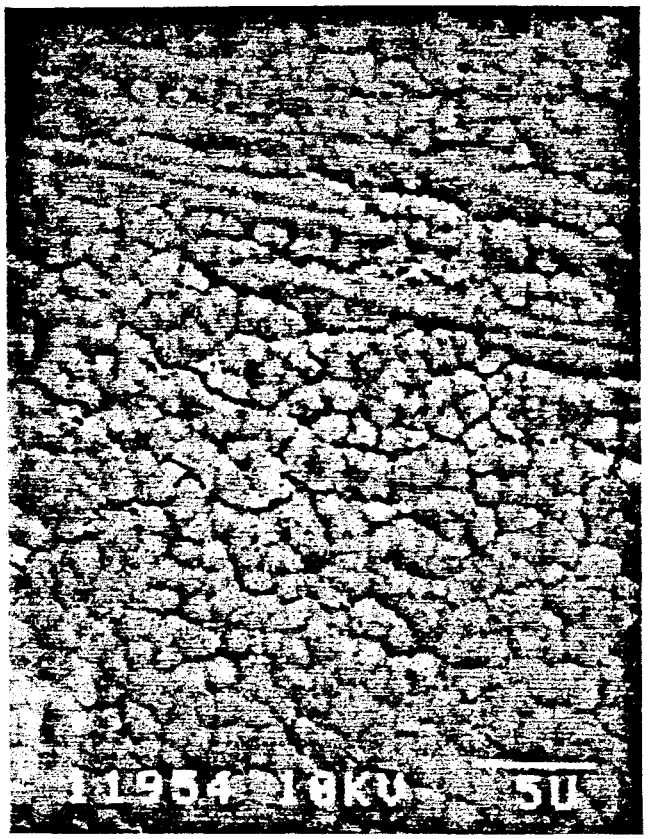
FIG. 8 is an SEM (3000×) of one surface the membrane made in accordance with Example 3.
Figure 9:
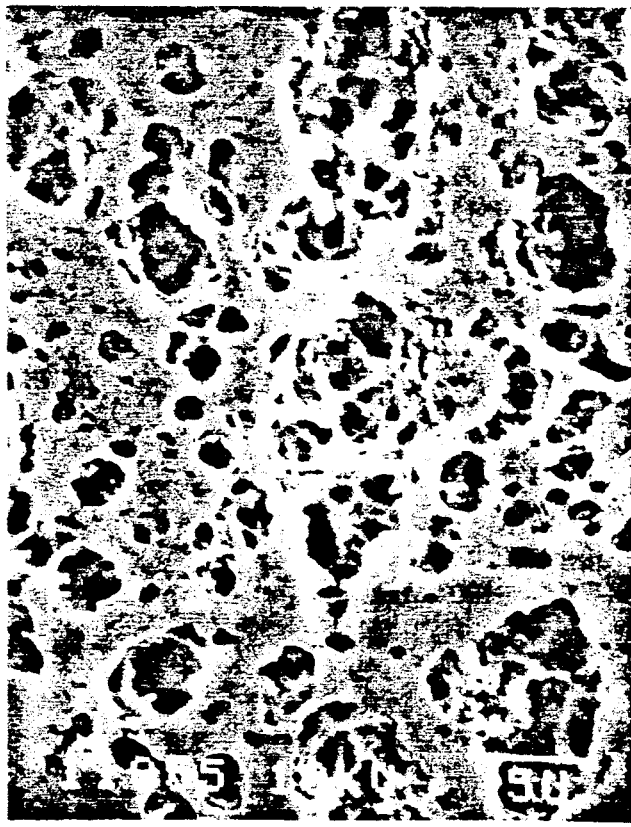
FIG. 9 is an SEM (3000×) of the opposing surface of the PFA membrane of FIG. 8.
Figure 10:
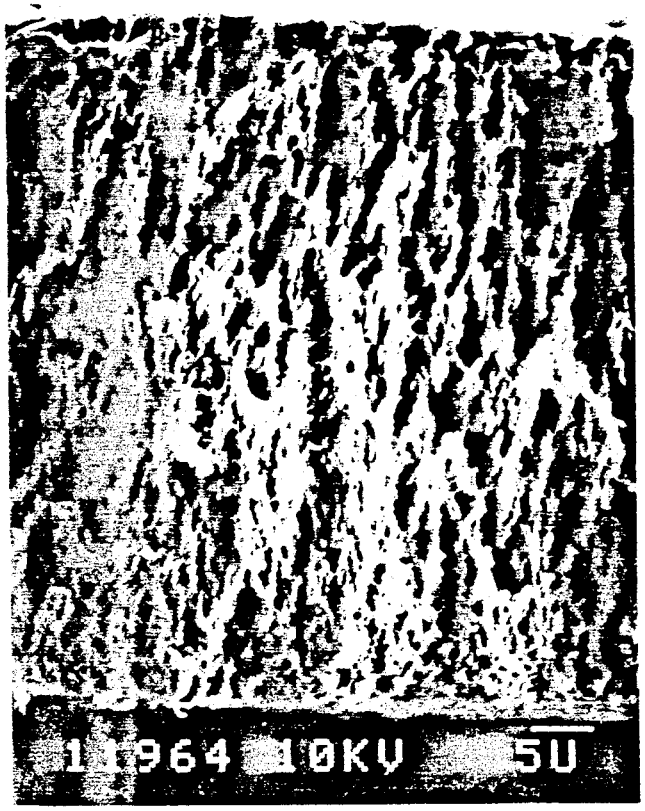
FIG. 10 is an SEM (1500×) of the cross-section of the membrane of FIG. 8 and 9.

The SEMs of the final extracted and heat-set membrane sample are shown in FIGS. 8–10. FIG. 8 shows the tight surface which directly contacted the quench roll during the quenching step. This surface reveals small pore openings whereas the reverse side shown in FIG. 9 has much larger surface pores with higher porosity. The internal morphology (FIG. 10) is highly porous and is similar to the sample in Example 1. The tight surface in this example will serve as a functional permselective layer when used in filtration applications. The more open internal structure and the open reverse surface will not contribute significantly to overall flux impediment. The characteristics of this membrane are:
Isopropyl Alcohol Bubble Point[1]=55 psi
Mean Isopropyl Alcohol Bubble Pressure[1]=65 psi
Isopropyl Alcohol Flow Rate[2]=1.36 ml/min/cm$^2$
Thickness=60 μm
Porosity[3]=67%

EXAMPLE 4

Example 3 was repeated under similar casting conditions except no solvent was co-extruded with melt blend film.

Figure 11:
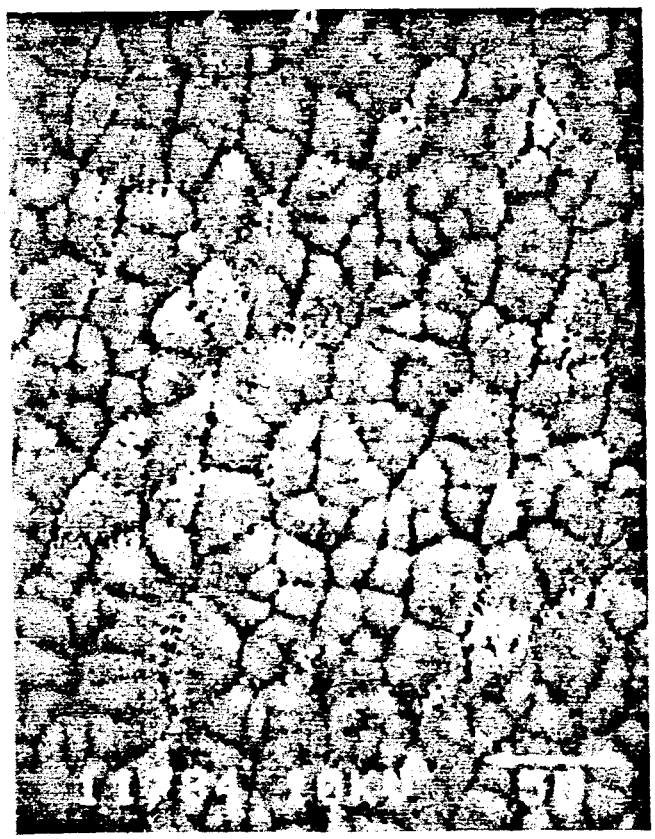
FIG. 11 is an SEM (3000×) of the surface of the membrane made in accordance with Example 4.
Figure 12:
FIG. 12 is an SEM (3000×) of the opposing surface of the membrane shown FIG. 11.
Figure 13:
FIG. 13 is an SEM (1500×) of the cross-section of the membrane of FIGS. 11 and 12.

The SEMs of this sample are shown in FIGS. 11-13. FIG. 11 showed surface which contacted the quench roll and is similar to that in Example 3. However, the reverse surface (FIG. 12) showed much lower surface porosity than the corresponding side in Example 3. This difference is reflected in the flow property given below. The characteristics of this membrane are:

Isopropyl Alcohol Bubble Point[1] = 53 psi
Mean Isopropyl Alcohol Bubble Pressure[1] = 59 psi
Isopropyl Alcohol Flow Rate[2] = 0.69 ml/min/cm$^2$
Thickness = 64 μm
Porosity[3] = 68%

EXAMPLE 5

This example demonstrates the effect of stretching with heat-setting on a cast PFA membrane.

To prepare the PFA precursor membrane, an extrusion process similar to that in Example 1 was used except for the following changes:

(1) The powder blend and downstream CTFE oil feeds were 8.5 and 11.0 gm/min respectively, thus overall PFA concentration in melt blend was approximately 19.5% (w/w).
(2) No solvent was co-extruded on either side of the melt blend film.
(3) The extrusion temperature range used was 250°-295° C.
(4) Air gap distance = 0.5 cm.
(5) Quench roll temperature = 225° C.
(6) Quenched film's thickness (before extraction) = 80 μm To remove the CTFE oil from the quenched film, a sample of approximately 20 cm. in length was placed in an excess volume of 1,1,2, trichclorotrifluoroethane (Freon TF) for extraction. The extraction time was approximately 2 hrs. with two fresh Freon changes during this time. The Freon wet sample was then mounted on an uniaxial stretcher which allows for elongation of the film in the transverse (cross-web) direction. The sample width (between clamps) in the unstretched state was 3.8 cm. and this was stretched to a final width of 7.6 cm. for a elongation ratio of 100%. The "necking-in" near the ends of the sample was allowed to occur. The sample was then dried at room temperature under restraint in the stretched state. It was further heat-set in an oven at 295° C. for 30 mins. This process was repeated for another sample except it was not elongated from its original width, the restraining and heat-setting were performed similarly. Membrane discs for testing were taken from the center part of each sample strip.

The properties of the unstretched and stretched samples are as follows:

|  | Unstretched | Stretched (100%) |
| --- | --- | --- |
| Isopropyl Alcohol Bubble Point[1] (psi) | 37 | 32 |
| Mean Isopropyl Alcohol Bubble Pressure[1] (psi) | 50 | 37 |
| Isopropyl Alcohol Flow Rate[2] (ml/min/cm$^2$) | 0.40 | 4.11 |
| Thickness (um) | 65 | 48 |
| Porosity[3] | 60 | 67 |

Figure 14:
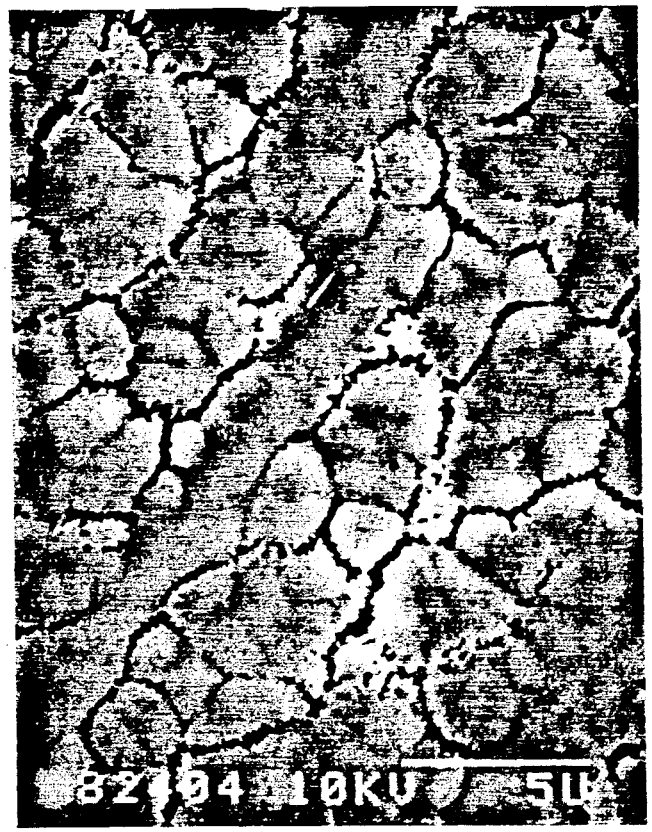
FIGS. 14 and 15 are SEMs (5000×) of both surfaces of the unstretched sample of Example 5.
Figure 15:
Figure 16:
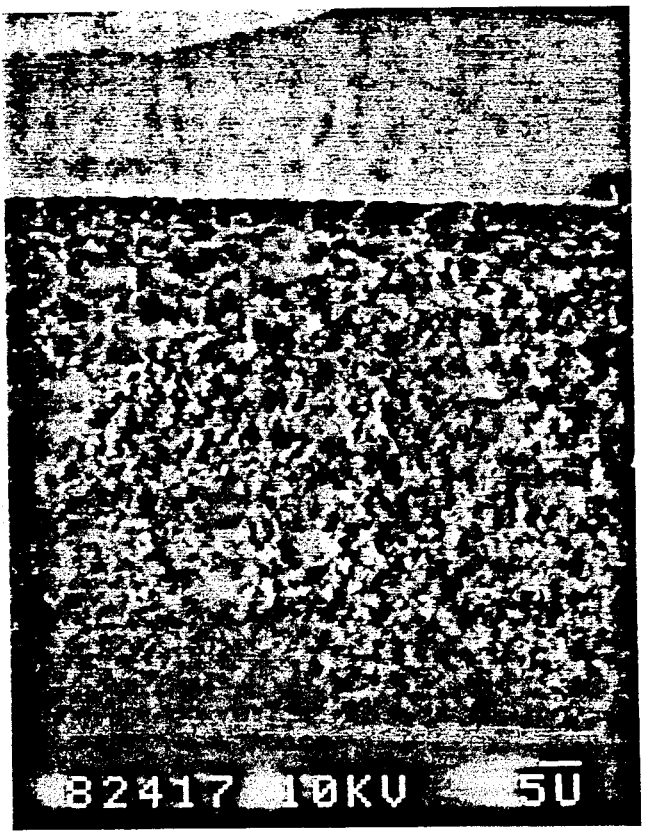
FIG. 16 is an SEM (100×) of the internal cross section of the unstretched sample of Example 5.
Figure 17:
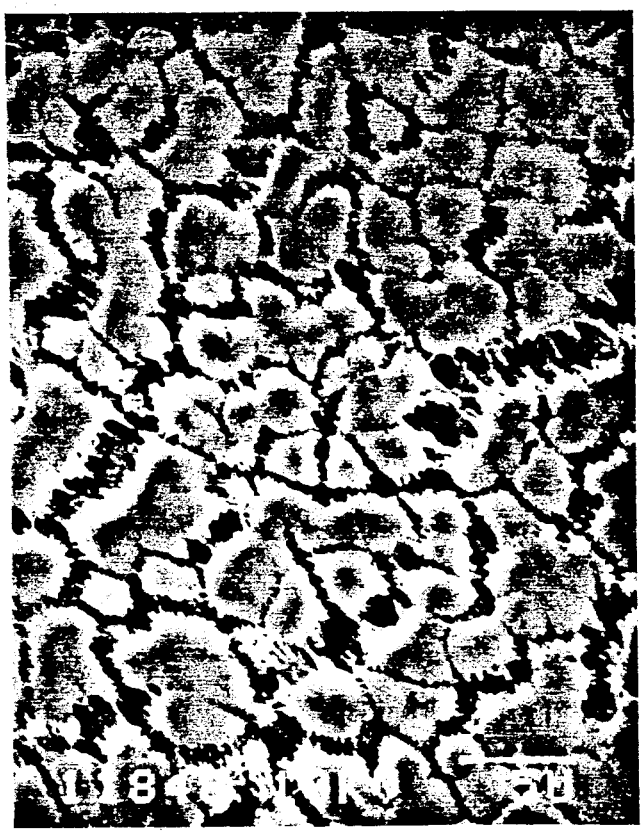
FIGS. 17 and 18 are SEMs (3000×) of both surfaces of the stretched sample of Example 5.
Figure 18:
Figure 19:
FIG. 19 is an SEM (2000×) of the internal cross section of the stretched sample of Example 5.
Figure 20:
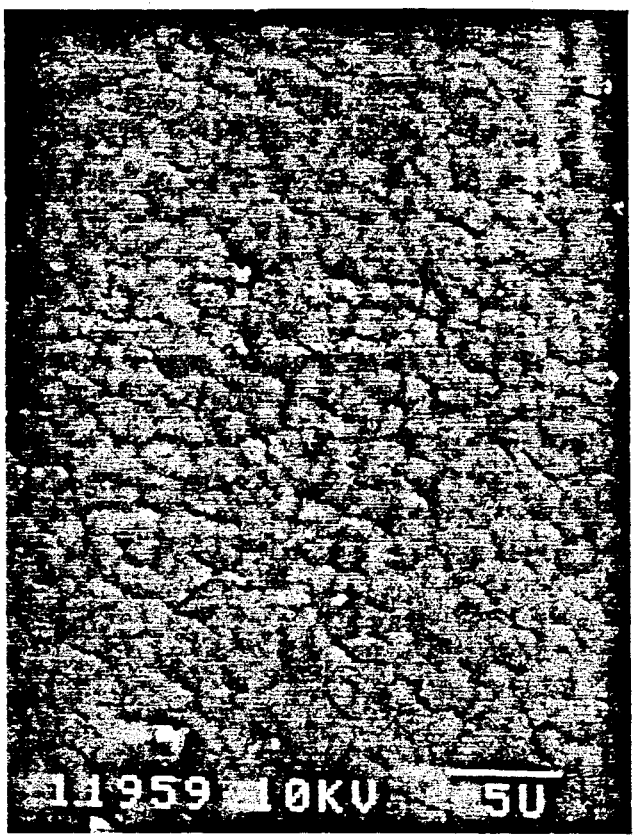
FIGS. 20 and 21 are SEMs (3000×) of both surfaces of the unstretched sample of Example 6.
Figure 21:

The scanning electron (SEM) Photomicrographs of the two samples are shown in FIGS. 14-19. FIGS. 14 and 15 are surfaces of the unstretched sample with the corresponding surfaces of the stretched sample given in FIGS. 17 and 18. They indicate both surfaces are more porous as a result of stretching with heat-setting. The internal structure of the samples are shown by the cross-sections in FIGS. 16 and 19.

EXAMPLE 6

This example demonstrates applying stretching to an asymmetric precursor PFA membrane that was prepared with co-extrusion of pure solvent on one side of the film during casting.

The precursor membrane was cast using similar process described in Example 1 except for the following changes:

(1) The powder blend and down stream CTFE oil feeds were 12.5 and 20 gm/min. respectively, thus overall PFA concentration in melt blend was approximately 17.5% (w/w).
(2) The extrusion temperature range used was 250°-310° C.
(3) CTFE oil co-extrusion rate on surface away from the chill roll contact = 4 5 gm/min., and no oil on surface that contacted the quench roll.
(4) Air gap distance = 1 cm.
(5) Quench roll temperature = 204° C.
(6) Quenched film's thickness (before extraction) = 80 μm The precursor sample was extracted and stretched in the transverse direction as in example 5 but this time at two different elongation ratios of 22 and 45%. Heat-setting condition was same as before. An unstretched sample was also prepared for comparison. The properties of the samples are as follows:

|  | Unstretched | Stretched (22%) | Stretched (45%) |
| --- | --- | --- | --- |
| Isopropyl Alcohol Bubble Point[1] (psi) | 60 | 45 | 34 |
| Mean Isopropyl Alcohol Bubble Pressure[1] (psi) | 73 | 50 | 42 |
| Isopropyl Alcohol Flow Rate[2] (ml/min/cm$^2$) | 0.83 | 3.06 | 6.25 |
| Thickness (um) | 58 | 50 | 43 |
| Porosity[3] | 65 | 73 | 75 |

Figure 22:
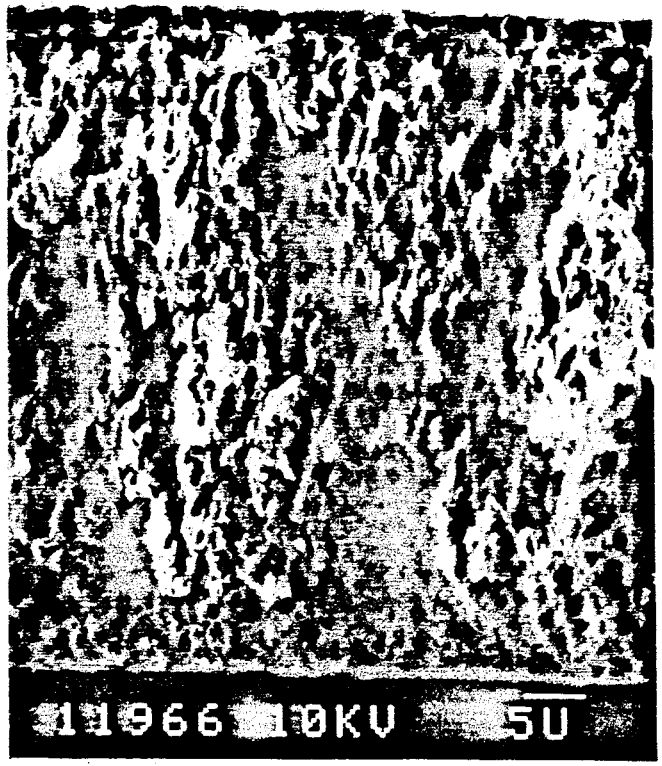
FIG. 22 is an SEM (1500×) of the cross section of the unstretched sample of Example 6.
Figure 23:
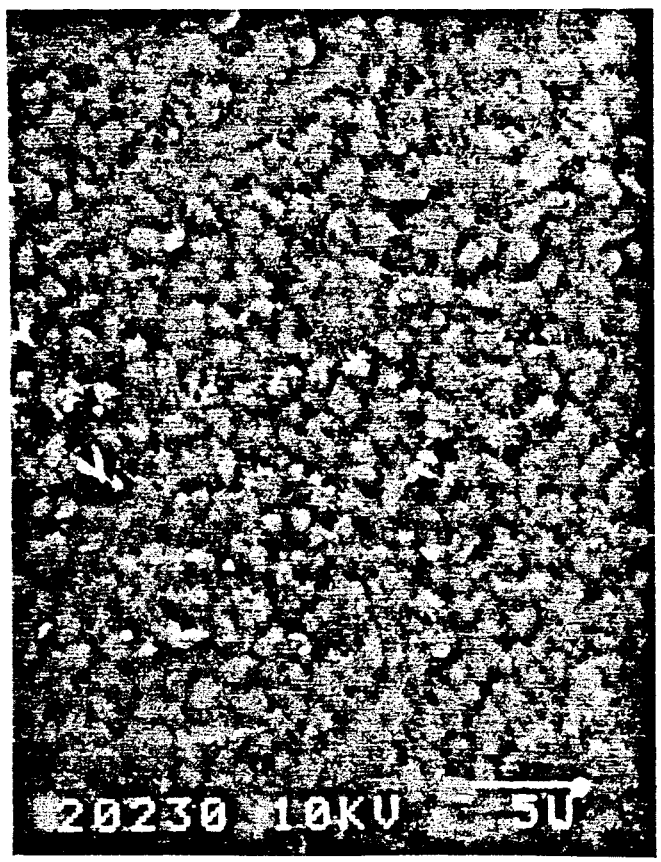
FIGS. 23 and 24 are SEMs (3000×) of both surfaces of the 45% stretched sample of Example 6.
Figure 24:
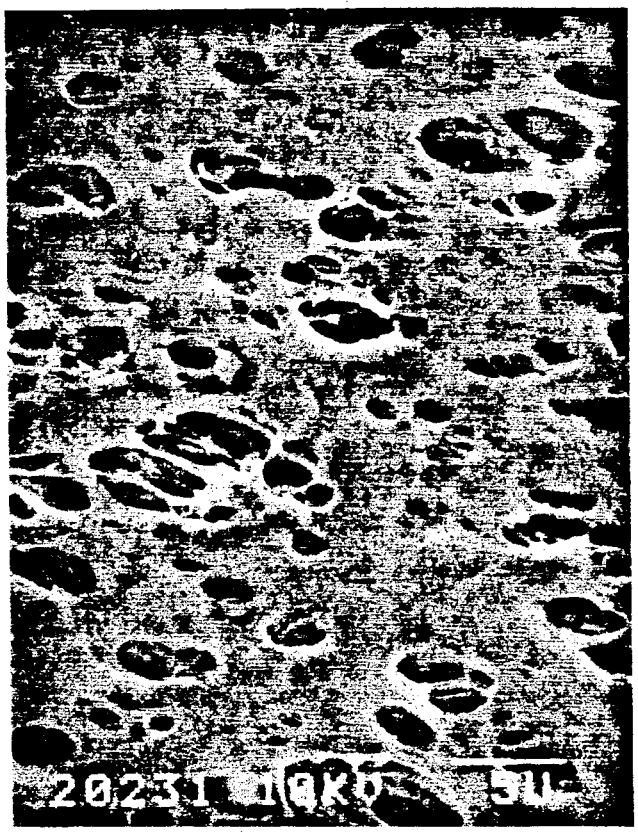
Figure 25:
FIG. 25 is an SEM (1500×) of the cross section of the stretched sample of Example 6.

The SEM photomicrographs of the unstretched and the 45% stretched samples are shown in FIGS. 20-25. The surfaces shown in FIGS. 20 (unstretched) and 23 (stretched) are surfaces which contacted the quench roll during casting. Both of the stretched sample's surfaces are again more open than the unstretched counterparts, but the difference in morphology between its two surfaces is retained. The cross-sections are shown in FIGS. 22 (unstretched) and 25 (45% stretched).

(1) A method similar to ASTM F316-80 (part II) was used for determining isopropyl alcohol (IPA) bubble point and mean IPA bubble pressure. Air flow through membrane sample vs applied pressure were measured for a dry sample disc and for the same disc wet with IPA. The IPA bubble point was determined from the air flow curve through the wet membrane disc, and was taken as the pressure when flow begins to deviate from linearity in the diffusional flow portion of the curve. This determination typically yields the same value as in the conventional "visual" bubble point method. The mean IPA bubble pressure was taken as the pressure when air flow through the wet membrane=($\frac{1}{2}$) air flow through the dry membrane. This mean value is also referred to as the mean flow pore pressure in the ASTM method. In the case of testing an asymmetric membrane sample, the tighter (smaller pore size) side of the sample was placed upstream of the applied pressure.

(2) ASTM F317-72, using isopropyl alcohol as the premeating liquid. The flow rate is measured at 25° C. and 700 mm Hg differential pressure.

(3) Porosity=$[1-(D/Dp)] \times 100\%$ where D=density of the porous membrane sample and Dp=density of the solid polymer.

We claim:

1. A microporous membrane produced from a polymer selected from the group consisting of [PFA and FEP] poly(tetrafluoroethylene-co-perfluoro(alkyl vinyl ether)) and poly(tetrafluoroethylene-co-hexafluoropropylene), having a symmetric porous structure and having a microporosity and permeability to provide an isopropyl alcohol flow rate above about 20, 5, 1.8, 1.1, 0.7, 0.5, 0.4 and 0.3 ml/min/cm$^2$ at 25° C. and 700 mn Hg differential pressure to define a curve as a function of a mean isopropyl alcohol bubble pressure of 10, 20, 40, 60, 80, 100, 120 and 140 psi respectively.

2. A microporous or open ultrafiltration membrane produced from a polymer selected from the group consisting of poly(tetrafluoroethylene-co-perfluoro(alkyl vinyl ether)) and poly(tetrafluoroethylene-co-hexafluoropropylene), having a microporosity and permeability to provide an isopropyl alcohol flow rate above about 20, 5, 1.8, 1.1, 0.7, 0.5, 0.4 and 0.3 ml/min/cm$^2$ at 25° C. and 700 mm. Hg. differential pressure to define a curve as a function of a mean isopropyl alcohol bubble pressure of 10, 20, 40, 60, 80, 100, 120 and 140 psi respectively.

* * * * *